United States Patent
Karczewicz et al.

(10) Patent No.: US 7,149,251 B2
(45) Date of Patent: Dec. 12, 2006

(54) APPARATUS, AND ASSOCIATED METHOD, FOR FORMING A COMPRESSED MOTION VECTOR FIELD UTILIZING PREDICTIVE MOTION CODING

(75) Inventors: Marta Karczewicz, Irving, TX (US); Jani Lainema, Irving, TX (US); Bogdan-Paul Dobrin, Tampere (FI)

(73) Assignee: Nokia Corporation, Espoo (FI)

( * ) Notice: Subject to any disclaimer, the term of this patent is extended or adjusted under 35 U.S.C. 154(b) by 476 days.

(21) Appl. No.: 10/778,449

(22) Filed: Feb. 13, 2004

(65) Prior Publication Data

US 2004/0165664 A1 Aug. 26, 2004

Related U.S. Application Data

(63) Continuation of application No. 09/371,641, filed on Aug. 11, 1999, now Pat. No. 6,735,249.

(51) Int. Cl.
  *H04B 1/66* (2006.01)
(52) U.S. Cl. ............ 375/240.16; 375/240.25; 375/240.12; 375/240.14; 382/233; 382/235; 382/236; 382/238; 348/699
(58) Field of Classification Search ......... 375/240.25, 375/240.12, 240.26, 240.14; 382/233, 235, 382/236, 238; 348/699
See application file for complete search history.

(56) References Cited

U.S. PATENT DOCUMENTS

| 5,347,446 A | | 9/1994 | Iino et al. |
| 5,488,419 A | * | 1/1996 | Hui et al. ............ 375/240.17 |
| 5,502,494 A | * | 3/1996 | Auld .................... 375/240.25 |
| 5,557,341 A | | 9/1996 | Weiss et al. |
| 5,686,963 A | | 11/1997 | Uz et al. |
| 5,778,192 A | | 7/1998 | Schuster et al. |
| 5,818,536 A | | 10/1998 | Morris et al. |
| 5,929,940 A | | 7/1999 | Jeanin |
| 6,122,320 A | | 9/2000 | Bellifemine et al. |
| 6,148,107 A | | 11/2000 | Ducloux et al. |

FOREIGN PATENT DOCUMENTS

| EP | 0691 789 | 1/1996 |
| EP | 0 874 526 | 10/1998 |
| GB | 2 317 525 | 3/1998 |
| WO | WO97/16025 | 5/1997 |
| WO | WO97/40628 | 10/1997 |

* cited by examiner

*Primary Examiner*—Shawn S. An
(74) *Attorney, Agent, or Firm*—Foley & Lardner LLP (57) ABSTRACT

Apparatus, and an associated method, motion compensates coding of video sequences. Motion compensated prediction is utilized in the representation of motion vector fields. Reduced numbers of bits are required to represent the motion vector field while maintaining a low prediction error, thereby facilitating improved communication of, and recreation of, video frames forming a video sequence.

24 Claims, 3 Drawing Sheets

Table 1

| Number of candidates from up | Number of candidates from left | Presence of direction bit | Presence of discrimination bit | Direction of winning candidate | Number of selection bits |
|---|---|---|---|---|---|
| 0 | 1 | X | X | X | None |
| 1 | 0 | X | X | X | None |
| 0 | 2 | X | Yes | X | 1 |
| 2 | 0 | X | Yes | X | 1 |
| 1 | 1 | Yes | X | X | 1 |
| 2 | 2 | Yes | Yes | X | 2 |
| 2 | 1 | Yes | Yes | From up | 2 |
| 2 | 1 | Yes | X | From left | 1 |
| 1 | 2 | Yes | Yes | From left | 2 |
| 1 | 2 | Yes | X | From up | 1 |

APPARATUS, AND ASSOCIATED METHOD, FOR FORMING A COMPRESSED MOTION VECTOR FIELD UTILIZING PREDICTIVE MOTION CODING

CROSS-REFERENCE TO RELATED APPLICATION

This Application is a continuation of U.S. patent application Ser. No. 09/371,641 filed on 11 August 1999 now U.S. Pat. No. 6,735,249.

The present invention relates generally to a manner by which to utilize motion compensation in coding a video sequence. More particularly, the present invention relates to apparatus, and an associated method, for encoding, and decoding, a video sequence utilizing motion compensated prediction. Motion fields of a segment are predicted from adjacent segments of a video frame and by using orthogonal affine motion vector field models. Through operation of an embodiment of the present invention, motion vector fields are formed with a reduced number of bits while still maintaining a low prediction error.

BACKGROUND OF THE INVENTION

Advancements in digital communication techniques have permitted the development of new and improved types of communications. Additional advancements shall permit continued improvements in communications and communication systems which make use of such advancements.

For instance, communication systems have been proposed for the communication of digital video data capable of forming video frames. Video images utilized during video conferencing are exemplary of applications which can advantageously make use of digital video sequences.

A video frame is, however, typically formed of a large number of pixels, each of which is representable by a set of digital bits. And, a large number of video frames are typically required to represent any video sequence. Because of the large number of pixels per frame and the large number of frames required to form a typical video sequence, the amount of data required to represent the video sequence quickly becomes large. For instance, an exemplary video frame includes an array of 640 by 480 pixels, each pixel having an RGB (red, green, blue) color representation of eight bits per color component, totaling 7,372,800 bits per frame.

Video sequences, like ordinary motion pictures recorded on film, comprise a sequence of still images, the illusion of motion being created by displaying consecutive images at a relatively fast rate, say 15–30 frames per second. Because of the relatively fast frame rate, the images in consecutive frames tend to be quite similar. A typical scene comprises some stationary elements, for example the background scenery and some moving parts which may take many different forms, for example the face of a newsreader, moving traffic and so on. Alternatively, the camera recording the scene may itself be moving, in which case all elements of the image have the same kind of motion. In many cases, this means that the overall change between one video frame and the next is rather small. Of course, this depends on the nature of the movement: the faster the movement, the greater the change from one frame to the next.

Problems arise in transmitting video sequences, principally concerning the amount of information that must be sent from the transmitting device to the receiver. Each frame of the sequence comprises an array of pixels, in the form of a rectangular matrix. To obtain a sharp image, a high resolution is required i.e. the frame should comprise a large number of pixels. Today, there are a number of standardized image formats, including the CIF (common intermediate format) which is 352×288 pixels and QCIF (quarter common Intermediate format) which is 176×144 pixels. QCIF format is typical of that which will be used in the first generation of mobile video telephony equipment and provides an acceptably sharp image on the kind of small (3–4 cm square) LCD displays that may be used in such devices. Of course, larger display devices generally require images with higher spatial resolution, in order for those images to appear with sufficient spatial detail when displayed.

For every pixel of the image, color information must be provided. Typically, and as noted above, color information is coded in terms of the primary color components red, green and blue (RGB) or using a related luminance/chrominance model, known as the YUV model which, as described below, provides some coding benefits. Although there are several ways in which color information can be provided, the same problem is common to all color representations; namely the amount of information required to correctly represent the color range present in natural scenes. In order to create color images of an acceptable quality for the human visual system, each color component must typically be represented with 8 bit resolution. Thus each pixel of an image requires 24 bits of information and so a QCIF resolution color image requires 176×144×(3×8)=608256 bits. Furthermore, if that QCIF image forms part of a video sequence with a frame rate of 15 frames per second, a total of 9,123,840 bits/s is required in order to code that sequence.

As such, amounts of data sometimes must be transmitted over relatively low bit-rate communication channels, such as wireless communication channels operating below 64 kilobits per second.

Video coding schemes are utilized to reduce the amount of data required to represent such video sequences. A key of many video coding schemes is a manner by which to provide motion compensated prediction. Motion compensated prediction, generally, provides a manner by which to improve frame compression by removing temporal redundancies between frames. Operation is predicated upon the fact that, within a short sequence of the same general image, most objects remain in the same location whereas others move only short distances. Such motion is described as a two-dimensional motion vector.

Some coding advantage can be obtained using the YUV color model. This exploits a property of the human visual system, which is more sensitive to intensity (luminance) variations than it is to color variations. Thus, if an image is represented in terms of a luminance component and two chrominance components (as in the YUV model), it is possible to spatially sub-sample (reduce the resolution of) the chrominance components. This results in a reduction in the total amount of information needed to code the color information in an image with an acceptable reduction in image quality. The spatial subsampling may be performed in a number of ways, but typically each block of 16×16 pixels in the image is coded by 1 block of 16×16 pixels representing the luminance information and 1 block of 8×8 pixels for both chrominance components. In other words, the chrominance components are sub-sampled by a factor of 2 in the x and y directions. The resulting assembly of one 16×16 luminance block and two 8×8 chrominance blocks is commonly referred to as a macroblock. Using this kind of coding scheme, the amount of information needed to code a QCIF image can be calculated as follows: The QCIF resolution is 176×144. Thus the image comprises 11×9 16×16 pixel luminance blocks. Each luminance block has two 8×8 pixel sub-sampled chrominance blocks associated with it, i.e., there are also 11×9 macroblocks within the image. If the luminance and chrominance components are coded with 8 bit resolution, the total number of bits required per macroblock is 1×(16×16×8)+2×(8×8×8)=3072 bits. Thus the number of bits required to code the entire QCIF image is now 99×3072=304128 bits i.e. half the number required if no chrominance sub-sampling is performed (see above). However, this is still a very large amount of information and if a QCIF image coded in this way is part of a 15 frame per second video sequence, a total of 4,561,920 bits/s are still required.

Video coding requires processing of a large amount of information. This necessarily means that powerful signal processing devices are required to code video images and, if those images are to be transmitted in their original form, a high bandwidth communication channel is required. However, in many situations it is not possible to provide a high capacity transmission channel. This is particularly true in video telephony applications, where the video signals must be transmitted over existing fixed line communication channels (i.e. over the conventional public telephone network) or using radio communication links, such as those provided by mobile telephone networks. A number of international telecommunications standards already exist, laying down the guidelines for video coding in these kinds of systems. The H.261 and H.263 of the International Telecommunications Union (ITU) standards are exemplary. Standard H.261 presents recommendations for video coding in transmission systems operating at a multiple of 64 kilobits/s (these are typically fixed line telephone networks), while H.263 provides similar recommendations for systems in which the available bandwidth is less than 64 kilobits per second. The two standards are actually very closely related and both make use of a technique known as motion predictive coding in order to reduce the amount of information that must be transferred.

In mobile videotelephony the aim is to transmit a video sequence over a transmission channel with an available bandwidth of approximately 20k bits per second. The typical frame rate should be sufficient to provide a good illusion of motion and thus should be between 10 and 15 frames per second. Thus it will be appreciated that a very large compression ratio (approximately 225:1) is required in order to match a video sequence requiring some 4.5 Megabits per second to a channel capable of transferring only 20 kilobits per second. This is where motion predictive coding, as well as other techniques, comes into play.

The basic idea behind motion predictive coding is to take into account the very large amount of temporal redundancy that exists in video sequences. As explained above, in a typical video sequence recorded at comparatively rapid frame rate (i.e. greater than 10 frames per second), there are only small changes from one frame to the next. Usually the background is stationary and only some parts of the image undergo some form of movement. Alternatively, if the camera itself is moving, all elements undergo some consistent movement.

Thus it is possible to take advantage of this high degree of correlation between consecutive frames when trying to reduce the amount of information when transmitting a video sequence. In other words, one frame can be predicted from a previous, so-called reference frame, which is usually, but not necessarily, the frame immediately preceding that currently being coded. In such a coding scheme, it is typically only the differences between the current frame and the reference frame, which are coded and transmitted to the receiver. In general, this kind of coding is referred to as INTER coding. It is a necessary requirement of such a coding scheme that both the transmitter and receiver keep a record of the reference frame (e.g. previous coded frame). At the transmitter the video encoder compares the current frame with the reference, identifies the differences between the two frames, codes them and transfers information about the changes to the receiver. In the receiver the current frame is then reconstructed in a video decoder by adding the difference information to the reference (e.g. previous) frame. The frame stores in the encoder and decoder are then updated so that the current frame becomes the new reference and the process continues in an identical fashion from one frame to the next.

There are of course, some situations in which this kind of prediction cannot be used. It is obvious that the first frame of a video sequence must always be coded and transmitted as such to the decoder in the receiver. Clearly there is no previous frame that can be used as a reference for predictive coding. A similar situation occurs in the case of a scene cut. Here the current frame may be so different from the previous one that no prediction is possible and again the new frame must be coded and transmitted as such. This kind of coding is generally referred to as INTRA coding. Many coding schemes also use periodic INTRA frame coding. For example one INTRA frame may be sent every ten or twenty frames. This is done to counteract the effect of coding errors that gradually accumulate and eventually cause unacceptable distortion in the reconstructed image.

Motion predictive coding can be viewed as an extension of the INTER coding technique introduced above. The account given above describes how difference information is sent to the receiver to enable decoding of a current video frame with reference to some previous frame. The simplest and most obvious way to provide the difference information would be to send the pixel values (YUV data) of each pixel in the current image that differs from the corresponding pixel in the reference image. However, in practice this solution does not provide the reduction in data rate necessary to enable video transmission over very low bit rate channels. Motion predictive coding adopts a different approach. As previously described, both encoder and decoder maintain a record of a reference frame and the current frame is coded with reference to that stored frame. At the decoder, the current image is reconstructed with reference to the stored previous frame and the difference information transmitted from the encoder.

In the encoder, the current frame is examined on a segment-by-segment basis in order to determine the correspondence between itself and the reference frame. A number of segmentation schemes may be adopted. Frequently, the current image is simply divided into regular blocks of pixels e.g. the comparison may be done macroblock by macroblock. Alternatively, the frame may be divided on some other basis; perhaps in an attempt to better identity the different elements of the image contained therein and thus enable a more accurate determination of the motion within the frame.

Using the predefined segmentation scheme, a comparison is made between each segment of the current frame and the reference frame in order to determine the "best match" between the pixels in that segment and some group of pixels In the reference frame. Note that there is no fixed segmentation applied to the reference frame; the pixels that correspond best to a given segment of the current frame may, within certain limitations explained below, have any location within the reference. In this way motion predictive coding can be viewed as an attempt to identity the origin of a group of pixels in the current image i.e. it tries to establish how pixels values propagate from one frame to the next by looking back into the reference frame.

Once a best match has been found for a given segment within the current frame, the correspondence between the segment and the reference frame is coded using "motion vectors". A motion vector can be considered as a displacement vector with x and y (horizontal and vertical) components, which actually points back from the segment of the current frame to pixel locations in the reference frame. Thus motion vectors actually identify the origin of pixels in the current frame by comparison with the reference frame. Coding continues until the origin of each segment in the current frame has been identified. The resulting representation can be thought of as a "motion vector field" describing the overall correspondence between the two frames.

Coding of a complete video frame, segment-by-segment, using motion vectors produces a very efficient representation of the current frame, as comparatively very few bits are required to code information about the motion vectors for each segment. However, the coding process is not perfect and there are errors and loss of information. Typically, errors arise because it is not possible to identify exactly corresponding pixel values in the reference frame. For example, there may be some change in image content from one frame to the next, so new elements appear in the current frame which have no counterparts in the reference frame. Furthermore, many predictive motion encoders restrict the type of motion allowed between frames. This restriction arises as follows: In order to further reduce the amount of information required to represent the motion vector field, motion predictive encoders typically use a "motion model" to describe the way in which pixel values may be propagated from one frame to the next. Using a motion model, the motion vector field is described in terms of a set of "basis functions." The propagation of pixel values from one frame to the next is represented in terms of these mathematical basis functions. Typically, the motion is represented as a sum involving the basis functions multiplied by certain coefficient values, the coefficients being determined in such a way as to provide the best approximation of the motion vector field. This re-expression of the motion vector field necessarily introduces some additional error, as the motion model is unable to describe the motion vector field exactly. However, this approach has a significant advantage because now only the motion model coefficients must be transmitted to the decoder. This advantage arises because the motion field basis functions are chosen in advance, according to the implementation and the level of accuracy deemed necessary, and as such they are known to both the encoder and decoder. Many currently proposed video coding schemes that make use of motion predictive coding, and in particular the H.263 standard, are based on a translational motion field model i.e. one whose basis functions can only represent straight line movement in the x and y (horizontal and vertical) directions. Thus rotations and skewing of picture elements that may occur between consecutive frames cannot be represented and this inevitably introduces errors into the predicted motion.

Finally, and in order to compensate for the errors introduced by the motion field coding process, typical motion predictive encoders include an error estimation function. Information about the prediction error is transmitted to the decoder, together with the motion field model coefficients. In order to estimate the error introduced in the motion field coding process, a motion predictive encoder typically also includes a decoding section, identical to that found in the receiver. Once the current frame has been encoded using the motion predictive methods described above, the decoding section of the encoder reconstructs the current frame and compares it with the original version of the current frame. It is then possible to construct an "prediction error frame," containing the difference between the coded current frame and the original current frame. This information, together with the motion field model coefficients and perhaps some information about the segmentation of the current frame, is transmitted to the decoder.

Even with the use of such an exemplary, significant amounts of data are still required to represent a video sequence.

An improved manner by which to code video sequences utilizing reduced amount of bits or reduced bit rates, while maintaining low prediction error would therefore be advantageous.

It is in light of this background information related to video data that the significant improvements of the present invention have evolved.

SUMMARY OF THE INVENTION

The present invention, accordingly, advantageously provides apparatus, and an associated method, for operating upon a video sequence utilizing motion compensated prediction.

A manner is provided by which to represent a motion vector field by dividing a video frame into segments and predicting a motion field of a segment from its adjacent segments and by using orthogonal affine motion vector field models. Operation of an embodiment of the present invention provides a manner by which to quickly, and compactly, encode motion vector fields while also retaining a low prediction error. Communication of improved-quality video frames together forming a video sequence is thereby provided.

Through operation of an embodiment of the present invention, a manner is provided by which to reduce the amount of information needed to represent the motion vector field while preserving, at the same time, a low amount of prediction error.

A motion field coder for an encoder is provided by which to form the motion vector field. Use is made of affine motion vector field modeling. In contrast, for instance, to a purely translational motion model, a more flexible representation of the motion field can be obtained using the affine modeling. Typical natural motion, such as zooming, rotation, sheer, or translation is able to be represented by affine motion vector field models. Conventional systems which utilize only a translational model are unable to represent other forms of motion.

The similarity of affine motion vector fields of neighboring segments of a video frame is exploited by utilizing affine prediction motion vector fields. If, for instance, two neighboring segments have similar motion vector fields, one of the motion vector fields can be computed from the other merely with the addition of a small, or even negligible, i.e., zero, refinement field. For each segment of a video frame, an affine motion model is selected which achieves satisfactorily low prediction error with as few non-zero coefficients as possible. Furthermore, orthogonal basis functions are utilized. The orthogonal basis functions have low sensitivity to quantization of corresponding motion-coefficients so that the coefficients are able to be represented with a small number of bits. That is to say, efficient transmission of the motion coefficients requires the coefficients to be quantized to low precision levels. However, types of basis functions conventionally utilized results in unacceptable increases in prediction error when represented by a small number of bits. As the coefficients corresponding to orthogonal basis functions are much more robust to quantization, advantageous utilization of the orthogonal basis function is made during operation of an embodiment of the present invention.

In one aspect of the present invention, a motion field coder is provided for a video encoder. The motion field coder is operable to form a compressed motion vector field which is formed of a set of motion vectors of all pixels of a current frame. The motion vector field is formed of a prediction motion vector field and a refinement motion vector field.

In another aspect of the present invention, a motion compensated predictor is provided for a video encoder. The motion compensated predictor receives indications of the compressed motion vector field formed by the motion field coder. The motion compensated predictor constructs a prediction frame. The predictor is operable to reconstruct the pixels of a frame by calculating the motion vector fields of each segment thereof. The motion vector field is computed based on a prediction motion vector field and refinement motion vector field.

In yet another aspect of the present invention, a motion compensated predictor is provided for a video decoder. The motion compensated predictor receives indications of a predicted motion vector field and refinement motion vector field coefficients.

In these and other aspects, therefore, apparatus for a video device for operation upon a video sequence is provided. The video sequence is formed at least of a current video frame having at least a first neighboring segment and a second neighboring segment. The apparatus forms approximations of a motion vector field of the second neighboring segment. The apparatus includes a motion vector field builder coupled to receive indications representative of a first affine motion model forming an approximation of a first motion vector field representative of the first neighboring segment. The motion vector field builder forms a second affine motion model responsive to the indications representative of the first affine motion model. The second affine motion model forms the approximation of the motion vector field of the second neighboring segment.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

The new manner of motion predictive video coding of an embodiment of the present invention report further reduces the amount of data to be transferred from encoder to decoder in a low bit-rate video coding system, while maintaining good image quality. The manner includes a new way of further predicting the pixel values of segments in the current frame using already coded segments of that same frame.

In one exemplary implementation, when a new video sequence is to be coded and transmitted, the first frame in the sequence is transmitted in INTRA format, as known from prior art and described above. That frame is then stored in the encoder and in the decoder and forms a reference frame for the next (i.e. second) frame in the sequence.

When the encoder begins encoding the second frame, it starts the coding process by examining the first segment of the frame. In the preferred embodiment, the current frame is divided into a set of 16×16 pixel segments, but this is not essential to the method and other segmentation schemes may be envisaged. Encoding is started from the upper leftmost segment and proceeds from left-to-right and top-to-bottom throughout the frame (i.e. the coding process is performed in rows, progressing from top to bottom).

A motion vector field that describes the mapping of pixel values between the reference frame and the first segment of the current frame is determined and then a so-called "affine" motion model is used to approximate that motion vector and to generate a set of motion coefficients. The affine motion model is a special class of motion model whose mathematical form is such as to allow translational, rotational and skewing movements between frames. It comprises 6 basis functions. Thus the motion vectors are essentially replaced by a sum involving the six basis functions multiplied by appropriately chosen "motion coefficients." It is then sufficient to transmit only the motion coefficients (or a subset thereof) to the decoder, as the basis functions themselves are known to (i.e. stored in) both encoder and decoder. The group of pixels in the reference frame that yields the best affine motion model for any given segment of the current frame may reside, at least in theory, in any region of the reference frame. It should be emphasized here that an aim of this method is not merely to minimize the prediction error, but to find the affine motion field model that yields the best match for a segment in a "rate-distortion" sense. This means that the best match is determined by taking into account both a measure of image distortion and a measure of the amount of data required to achieve that level of distortion.

Since the first (upper leftmost) segment of the frame has no previously coded neighbors, no further action can be taken and the encoder proceeds to the second segment of the current frame. Then the affine motion field model providing the best mapping between the reference frame and the second segment of the current frame is determined, using the same kind of rate-distortion, best-match evaluation as previously described. As before, the corresponding region of pixel values may reside anywhere in the reference frame and may indeed overlap with that previously determined as the best match for the first segment of the current frame.

The second segment has one previously coded neighboring segment (i.e. the first segment). The encoder now considers whether it is "more efficient" to model the second segment in terms of the affine motion model previously determined for the first segment, rather than according to the newly determined affine motion coefficients for the second segment itself. The rationale is as follows: Since the motion coefficients for the first segment have already been determined and transmitted to the decoder, it may be possible to reduce the amount of information that must be transmitted to the decoder while encoding the second segment. Hence an improvement in coding efficiency may be obtained.

However, it is unlikely that the motion coefficients for the first segment are exactly identical to those that most accurately model the motion vector field of the second segment. Therefore the motion coefficients calculated for the first segment are not simply used as such, but a projection is performed in order to map the motion field of the first segment into the second segment. Even after this projection has been performed, it is still likely that some information about the difference between the motion fields of the first and second segments must also be sent to the decoder, in order to avoid unacceptable distortion in the reconstructed image. Thus, the encoder performs a comparison between the amount of data of required a) to transmit motion coefficient data determined specifically for the second segment and b) that required if the second segment's motion vector field is determined from a projection of the motion model of the first segment plus some "refinement" information. When making its choice of what information to transmit, the encoder must also take into account distortions that may introduced into the image by the prediction process. This comparison between options can be thought of as determining the "cost" of choosing a particular option, a trade-off between the amount of information to be transmitted and the amount of distortion allowed.

The benefit of this approach to motion predictive coding may not be immediately apparent. However, in many cases, it is found that after projection of the motion field model from a neighboring segment, very little or even zero refinement information is required. This can result in a significant reduction in the amount of data that must be transmitted from encoder to decoder. In the case where zero refinement information is required, the motion vector field of the second segment can be predicted purely on the basis of motion coefficients already stored in the decoder.

So far in this example, only the first and second segments of the frame have been considered. As explained above, according to the segmentation scheme used in the preferred embodiment of the invention, the second segment has only one neighbor that can be used to predict its motion coefficients. The same is true for all other segments on the first row of the frame. All such segments can only have previously coded neighbors immediately to their left. However, on the second and subsequent rows of the image, previously coded segments are also available above each segment. Thus, segments in subsequent rows have neighbors to the left and above. This is true for all segments except the first in each row, which only has a previously coded neighbor directly above it. Thus, when considering a general segment in a frame to be coded, there are several possibilities for the prediction of motion coefficients. In a general case, the encoder can try to predict the motion coefficients for a given segment using the motion field model for the segment above it or to the left. Alternatively, it can form some kind of average, using the motion field model for both neighbors. In each case the motion field model predicted from the neighboring segment(s) is referred to as the "prediction field" and the difference between the prediction field and the motion field model determined specifically for the segment itself is termed the "refinement field." In the preferred embodiment, both the prediction and refinement fields are affine motion field models. The sum of the prediction field and the refinement field should thus be equivalent to the motion field model determined by applying the affine motion model to the segment itself. In a situation where it is not possible to predict the motion field model for a given segment from any of its neighbors, the prediction field is set to zero and the refinement field becomes equal to the motion field model determined specifically for the segment itself As will be appreciated from the description above, there are several different ways in which a given segment can be coded. The choice of which option to use is made in the encoder on the basis of the "rate-distortion" considerations previously described. Consequently, several different types of data must be transmitted to the decoder, depending on the chosen coding option, and that information must be transmitted to the decoder in an unambiguous way, so that the segment can be correctly reconstructed and displayed. The various coding options are as follows. 1.) A given segment can be represented as a sum of a prediction field and a refinement field. 2.) The segment may be represented as a prediction field only. This situation may arise when the segment can be adequately represented in terms of the motion field of one or more of its previously coded neighbors and no refinement information is necessary, or in a case where the encoder has found it efficient to reduce the refinement field to zero. 3.) The segment in question may be coded using a motion model determined specifically for the segment using the reference frame. In this case, as described above, the prediction field is set to zero and the refinement field is set equal to the motion field model determined from the reference frame.

Basically, there are two types of information that must be transmitted to the decoder in order to enable correct reconstruction of a given segment. These are: 1.) selection information, enabling the decoder to select the correct neighboring segment(s) to use in prediction; 2.) motion coefficient information. Whenever a segment is coded using a prediction field, whether there is an associated refinement field or not, it is necessary to provide information about the neighboring segment(s) used in the prediction. It is not necessary to transmit any motion coefficient data because the motion field model(s) of the previously coded neighboring segment(s) are already known to (i.e., stored in) the decoder. Extra information may also be required if, for example, prediction is based on more than one neighboring segment, or neighboring segments have been divided into sub-segments and the motion field model of one or more of the sub-segments is used to form the prediction field. When a refinement field is used, motion coefficient values must be provided. In this case, it should be remembered that it is only necessary to transmit motion coefficient data because the motion model basis functions are know to the decoder as well as the encoder.

The data stream transmitted from encoder to decoder is therefore likely to contain both motion coefficient data and a variety of selection data (i.e., non-motion coefficient data) instructing the decoder to perform different operations. For example, if the decoder receives non-motion coefficient data, it should construct a prediction motion field model using the neighboring segment(s) or sub-segment(s) indicated by the selection data. If it receives motion coefficient data, the decoder must construct a refinement motion field model using the transmitted motion coefficient values and the stored motion model basis functions. The format of the data stream provided by the encoder in the preferred embodiment of the invention is described in detail later in the text.

Some further refinements of the method are possible. In the preferred embodiment of the invention, neighboring segments can be divided into smaller sub-segments. Specifically, each 16×16 pixel segment may be divided into four 8×8 pixel blocks and the motion field models for those sub-segments can be used to derive prediction fields. In this case, a general 16×16 pixel segment has four immediately neighboring 8×8 pixel sub-segments that may be considered, two directly above and two immediately to the left. In this situation, the decision process is a little more complicated, but works in an essentially identical fashion to that described in the preceding paragraphs. The choice of sub-segment size is not limited to the example just-presented and a variety of other sub-segment sizes can be envisaged. For example, 4×8 or 8×4 pixel blocks could be used as sub-segments.

As stated above, when the method according to the invention is applied in practice, it is often found that very little refinement information is required and the motion model of a general segment can be predicted with quite high precision from the motion field models of its neighbors. The invention includes a further feature, whereby individual coefficients of the refinement field or the entire refinement field may be set to zero, if that is efficient in a "rate-distortion sense." In other words, the refinement field may be set to zero if the image distortion introduced in doing that is acceptable when considering the reduction in the amount of data to be transmitted. This additional feature further reduces the amount of data that must be transmitted from encoder to decoder.

Figure 1:
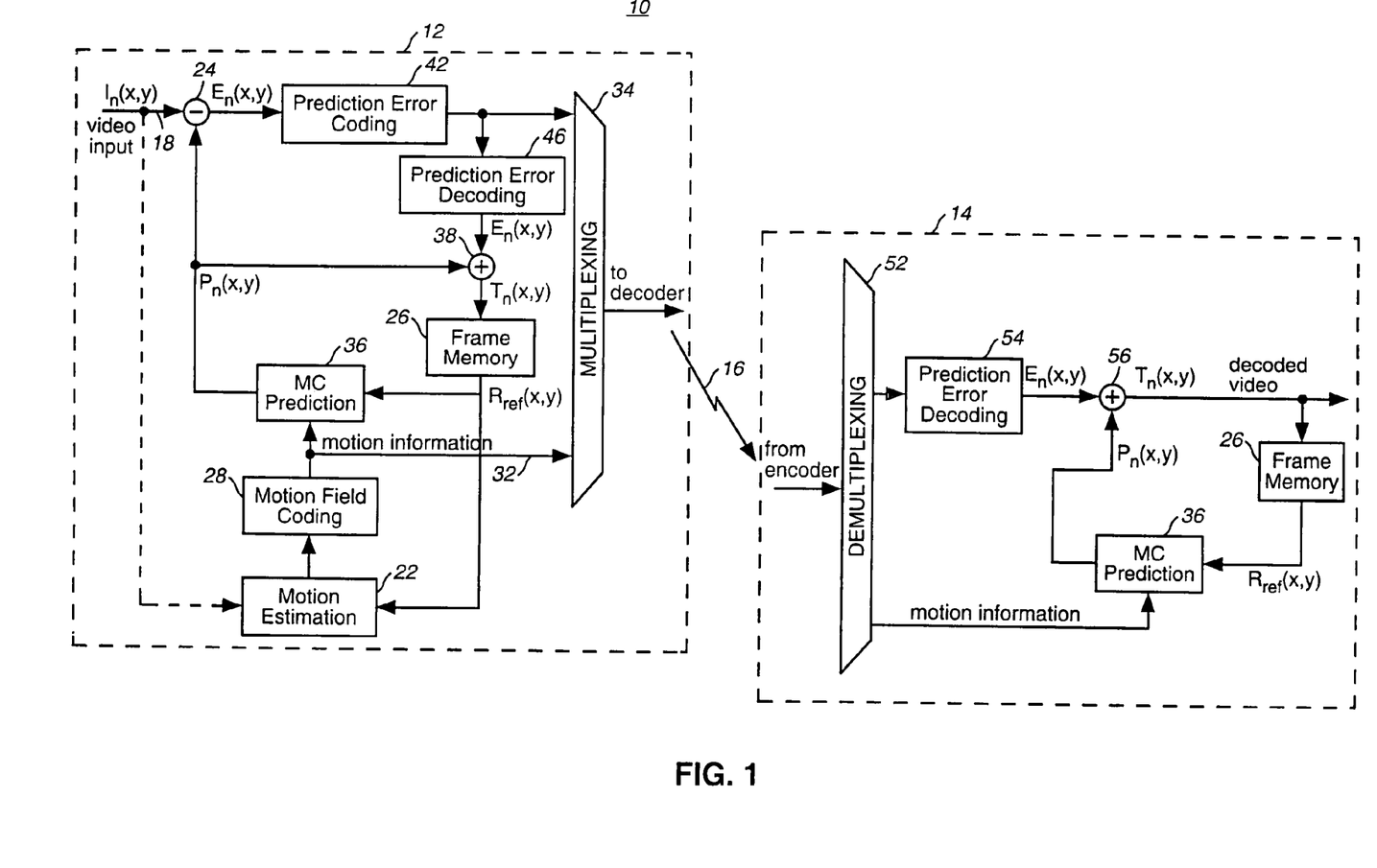
FIG. 1 illustrates an encoder and decoder of a video communication system in which an embodiment of the present invention is operable.

Referring first to FIG. 1, a communication system, shown generally at 10, is operable to communicate a video sequence between a video sequence generator and a video sequence receiver. In the illustration of the Figure, the encoder 12 of the video sequence generator is shown, and a decoder 14 which forms a portion of the video sequence receiver is also shown. Other elements of the video sequence generator and receiver, respectively, for purposes of simplicity, are not shown. A communication path 16 is shown to interconnect the portions of the communication system. The communication path can take any of various forms, including, e.g., a radio-link.

The encoder 12 is here shown to be coupled to receive a video input on the line 18. The video input is provided to a motion estimator 22 and to an input of a subtractor 24. The motion estimator is also coupled to receive indications of a reference frame stored at a frame memory 26. The motion estimator calculates motion vectors of pixels between a frame being coded, i.e., the current video input $I_n(x, y)$, and a prior, i.e., reference frame, $R_{ref}(x, y)$.

Once the encoder has coded each segment, the information necessary for its reconstruction can be transmitted to the decoder and the decoder can start reconstructing the segment. Because each frame is coded on a segment-by-segment basis and only previously coded segments are used in the prediction process, reconstruction of the frame at the decoder can start at once i.e. there is no need to wait until the entire frame has been encoded. Information about each segment is transmitted to the decoder as soon as it becomes available and decoding of the frame occurs at the receiver essentially in parallel with the encoding process. In videotelephony applications this has the advantage that end-to-end delay is kept to a minimum. Of course, the method can also be applied in video storage and retrieval systems where immediate transmission is not a necessary requirement. In that case, there is no requirement for data to be transmitted immediately and it might also be possible to use other neighboring segments in the current frame for prediction purposes.

The motion estimator 22 is coupled to a motion field coder 28. The motion field coder 28 is operable to form a motion vector field which is a set of motion vectors of all pixels of the current frame. The field generated by the motion field coder is provided by way of the line 32 to a multiplexor 34 thereafter to be communicated upon the communication path 16 to the video sequence receiver and the decoder 14 thereof.

The encoder is further shown to include a motion compensated (MC) predictor 36. The predictor 36 is also coupled to the frame memory 26. The predictor 36 is operable to generate a prediction frame which is supplied to the subtractor 24 and also to a summer 38.

Difference values formed by the subtractor 24 are provided to a prediction error coder 42. The prediction error coder determines the differences in pixel value between the current input video frame and the MC predicted version of the frame in order to produce an indication of the prediction error. And, in turn, the prediction error coder 42 is coupled to the multiplexor 34 and to a prediction error decoder 46. The prediction error decoding block decodes the prediction error which is added to the MC predicted current frame by the adder 38 and the result is stored in the frame memory 26.

The decoder 14 is here shown to include a demultiplexor 52, a prediction error decoder 54, a motion compensated predictor 36, a summer 56, and a frame memory 26. The predictor 36 of the encoder and of the decoder are commonly numbered as are the frame memories 26 of the respective devices.

The motion estimator 22 calculates motion vectors ($\Delta x(x, y)$, $\Delta y(x, y)$) of pixels between the frame being coded, referred to as the current frame $I_n(x, y)$, and the reference frame $R_{ref}(x, y)$. The reference frame is one of the previously coded and transmitted frames which at a given instant is available in the frame memory 26 of the encoder and also of the decoder.

$\Delta x(x, y)$ and $\Delta y(x, y)$ are the values of the horizontal and vertical displacements, respectively. The set of motion vectors of all pixels in the current frame, referred to as a motion vector field, is compressed by the motion field coder 28 and thereafter, as noted above, sent to the decoder.

To indicate that the compression of the motion vector field is typically lossy, the compressed motion vectors are denoted as ($\tilde{\Delta}x(x,y),\tilde{\Delta}y(x,y)$). In the motion compensated predictor 36, the compressed motion vectors and the reference frame are used to construct a prediction frame, $P_n(x, y)$. The prediction frame is a coded version of the current frame $I_n(x, y)$ calculated using the motion vector field determined by the motion estimator 22 and the motion field coder 28 and the pixel values of the reference frame $R_{ref}(x, y)$. The following equation shows the manner in which the prediction frame is calculated:

$$P_n(x,y)=R_{ref}(x+\tilde{\Delta}x(x,y),y+\tilde{\Delta}(x,y)) \qquad \text{EQUATION 1}$$

The prediction error, i.e., the difference between the current frame and the prediction frame, is as follows:

$$E_n(x,y)=I_n(x,y)-P_n(x,y) \qquad \text{EQUATION 2}$$

The prediction error is compressed and sent to the decoder 14. The compressed prediction error is denoted as $\tilde{E}_n(x,y)$.

At the decoder 14, pixels of the current coded frame $\tilde{I}_n(x,y)$, are reconstructed by finding the prediction pixels in the reference frame $R_{ref}(X, y)$ using the received motion vectors and by adding the received prediction error $\tilde{E}_n(x,y)$ as follows:

$$\tilde{I}_n(x,y)=R_{ref}(x+\tilde{\Delta}x(x,y),y+\tilde{\Delta}(x,y))+\tilde{E}_n(x,y) \qquad \text{EQUATION 3}$$

The difference between the coded frame and the original frame is designated as follows:

$$D_n(x,y)=I_n(x,y)-\tilde{I}_n(x,y) \qquad \text{EQUATION 4}$$

and is referred to as the reconstruction error.

The motion compensated prediction frame $P_n(x, y)$, formed by the MC predictor 36 is constructed in such a way as to minimize the amount of reconstruction error, and at the same time, minimize the amount of information needed to represent the motion vector field.

A frame of a typical video sequence contains a number of segments with different motion. Therefore, motion compensated prediction is performed by dividing the frame $I_n(x, y)$ into several segments and estimating the motion of such segments between such frame and a reference frame. Segmentation information is an inherent part of motion representation. Unless a default frame segmentation is used, and known both to the encoder and to the decoder, additional information describing the final partition of the frame must be transmitted to the decoder. In practice, a segment typically includes at least a few tens of pixels. In order to represent the motion vectors of such pixels compactly, it is desirable that their values be described by a function of a few parameters. Such a function is referred to as a motion vector field model. For the purposes of the following description, the motion vectors of an image segment shall be approximated using the following general, additive expression:

$$\Delta x(x,y)=\Delta x_{prd}(x,y)+\Delta x_{refine}(x,y) \Delta y(x,y)=\Delta y_{prd}(x,y)+\Delta y_{refine}(x,y)$$ EQUATION 5

The second terms of the above equation are referred to as refinement motion vector fields and are expressed as linear combinations as follows:

$$\Delta x_{refine}(x, y) = \sum_{n+1}^{N} c_n f_n(x, y)$$ EQUATION 6

$$\Delta y_{refine}(x, y) = \sum_{n=N+1}^{N+M} c_n f_n(x, y)$$

The parameters $c_n$ are referred to as refinement motion coefficients. The coefficients are compressed at the encoder transmitted upon the communication path 16, and then recovered at the decoder 14.

The functions $f_n$ are referred to as basis functions and are known to both the encoder 12 and to the decoder 14. The set of vectors $(\Delta x_{prd}(x,y), \Delta y_{prd}(x,y))$ is referred to as a prediction motion vector field and is also known to both the encoder and to the decoder.

The prediction error frame, $E_n(x, y)$ see equation 2, resulting after motion compensated prediction is typically encoded by using a two-dimensional transform such as a discrete cosine transform (DCT). This process is referred to as prediction error coding and aims to reduce the prediction error. Since the prediction error coding is usually lossy, this results in a reconstruction error.

A primary task of the encoder 12 is to find a suitable set of motion coefficients which are to be encoded and transmitted to the decoder. Usually, by increasing the number of bits allocated to the coding of coefficients, the resultant, incurred distortion is reduced. However, the decrease in distortion is not always worth the increased number of bits. Typically, a way to deal with such a tradeoff is to minimize the following Lagrangian criterion as follows:

$$L=D+\lambda \cdot B$$ EQUATION 7

In this equation, the term D represents the incurred distortion, i.e., error, when encoding by a given set of coefficients. The cost of sending the coefficients is represented by the number of bits B. The factor $\lambda$ is a constant referred to as the Lagrangian parameter.

In operation of an embodiment of the present invention, the motion vector field of a given segment of a video frame is a sum of two affine motion vector fields, namely, the prediction motion vector field and the refinement motion vector field as follows:

$$\Delta x(x,y)=\Delta x_{prd}(x,y)+\Delta x_{refine}(x,y) \Delta y(x,y)=\Delta y_{prd}(x,y)+\Delta y_{refine}(x,y)$$ EQUATION 8

The prediction motion vector field is obtained from the motion vector field of one or more neighboring segments in one of several ways. For instance, in one implementation, the prediction motion vector field is obtained by extrapolating the affine motion vector field of a neighboring, e.g., adjacent, segment inside the area covered by the current segment. As the current segment can have several neighboring segments, usually signaling information is provided to the decoder in order to specify which segment shall be used. In another implementation, the prediction motion vector field is obtained from a combination of affine motion vector fields of several neighboring segments using some particular method which is known both to the encoder and to the decoder. Such method is, for example, averaging or determining the median, of horizontal and vertical motion vector field components.

The refinement motion vector field has an affine model expressed as follows:

$$\Delta x_{refine}(x, y) = \sum_{n=1}^{3} c_n f_n(x, y)$$ EQUATION 9

$$\Delta y_{refine}(x, y) = \sum_{n=1}^{3} c_{n+3} f_n(x, y)$$

in which the basis functions $f_1, \ldots, f_3$ are affine orthogonal functions. The basis functions are orthogonal with respect to a rectangle circumscribing the given segment. And, the coefficients $c_1, \ldots, c_6$, are refinement motion vector field coefficients corresponding to the orthogonal set of basis functions.

The refinement motion coefficients are determined for every segment in the frame by the motion field coder during encoding by the encoder 12, and, in particular, by the motion field coder 28.

Figure 2:
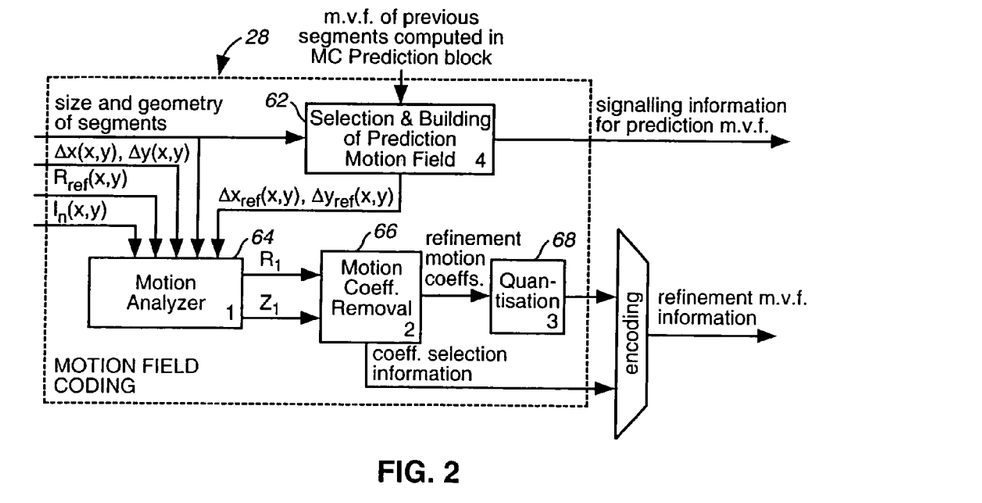
FIG. 2 illustrates a functional block diagram of a motion field coder which forms a portion of the communication system shown in FIG. 1.

FIG. 2 illustrates the motion field coder 28 in greater detail. The coder 28 is here shown to include a selector and builder of prediction motion fields 62, a motion analyzer 64, a motion coefficient remover 66, and a quantizer 68.

The selector and builder 62 is operable, for a given segment, to determine a previously-encoded segment of the current frame, or a combination of such segments, whose motion vector field, or fields, is best suitable for predicting the motion field of a given, e.g., current segment. Based on the motion vector field of the "winning" candidate, or candidates, the prediction motion field is computed as described above. Usually, signaling information is transmitted to the decoder to specify the most suitable amongst the several candidate segments.

The motion analyzer 64 is operable to find a new representation of a refinement motion vector field. That is to say, a mathematically efficient representation is made. The new representation is later used at the motion coefficient remover 66 for a quick and flexible determination of refinement motion coefficients.

The motion coefficient remover 66 is operable to determine which of the refinement coefficients should be set to zero and to calculate the value of remaining non-zero coefficients so as to minimize the Lagrangian criterion as follows:

$$L(c)=D(c)+\lambda \cdot B(c) \quad \text{EQUATION 10}$$

in which D(c) and B(c) are measures of prediction error and bits corresponding to encoding the given segment by using the refinement motion coefficients c. The constant λ is a Lagrangian parameter. When setting some of the refinement motion vector field coefficients to zero, the prediction error is increased. However, when more coefficients are set to zero, the number of bits required to be transmitted by the encoder to the decoder is reduced. Therefore, the value of the Lagrangian can decrease when some of the refinement motion coefficients are set to zero.

The quantizer 68 is operable to quantize the remaining non-zero refinement motion vector coefficients in order to make such coefficients suitable for entropy coding and transmission from the encoder to the decoder.

Figure 3:
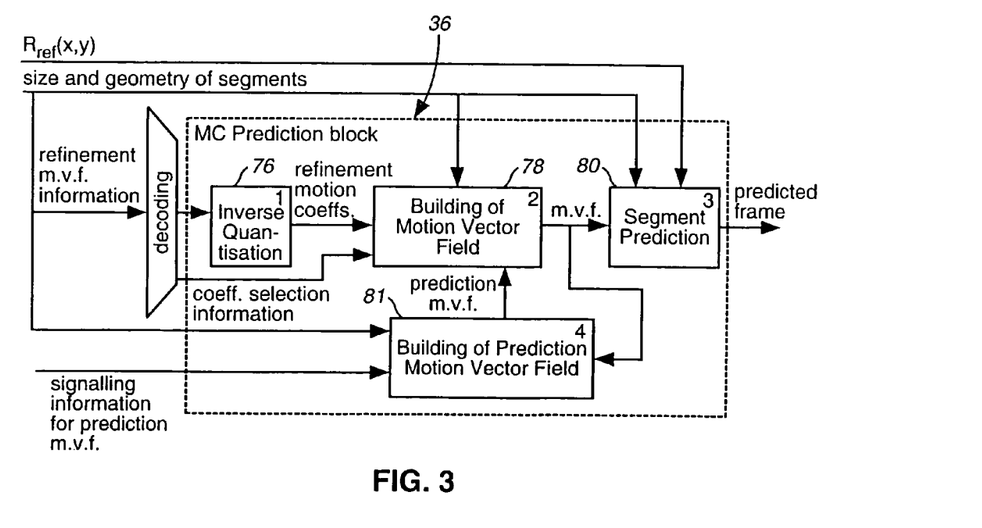
FIG. 3 illustrates a functional block diagram of a motion compensated predictor which forms a portion of the encoder and also of the decoder of the communication system shown in FIG. 1.

FIG. 3 illustrates the motion compensated (MC) predictor 36 forming portions of both the encoder and decoder 12 and 14 respectively, as shown in FIG. 1. The functional elements of the MC predictor 36 are similar for both the encoder and the decoder and the MC predictor is operable, at both the encoder and decoder to reconstruct the pixels of a current frame by calculating the motion vector fields of each segment within the frame. The motion vector field is computed based upon a prediction motion vector field ($\Delta x_{prd}(x,y)$, $\Delta y_{prd}(x,y)$) and the refinement motion vector field coefficients. In the exemplary implementation, the refinement motion vector fields are represented by their inverse quantized values. At the decoder 14 the prediction motion vector field is derived from one or several neighboring segments which have already been decoded. The refinement motion vector field coefficients are available at the decoder after the decoding and inverse quantization performed by the inverse quantizer 76. As illustrated, the MC predictor further includes a motion vector field builder, a segment predictor 80 and a prediction motion vector field builder 81.

As FIG. 2 illustrates, inputs to the motion analyzer 64 of the motion field coder 62 include the estimation motion vector field ($\Delta x(x, y)$, $\Delta y(x, y)$). The motion vector field is provided by the Motion Estimator 22 (shown in FIG. 1). The motion vector field is calculated in the motion estimator 22 in a conventional fashion. The prediction motion vector field is also provided to the motion analyzer. And, the geometry, that is, the size and shape, of the segment, S, which is to be coded and the reference and current frames ($R_{ref}(x\ y)$ and $I_n(x, y)$, respectively) are also provided as inputs to the motion analyzer.

The motion analyzer is operable to perform several operations. First, the motion analyzer performs error linearization. The prediction error $D_i$ of a given segment $S_i$, which consists of P pixel coordinates $(x_p,y_p)$, p=1,2 . . . P and whose prediction motion field is denoted by ($\Delta x_{prd}(x_p,y_p)$, $\Delta y_{prd}(x_p,y_p)$) and whose refinement motion vector field is approximated by an affine motion model as given by equation 9 is:

$$D_i = \sum_{p=1}^{P} (I_n(x_p, y_p) - R_{ref}(x_p + \Delta x_{prd}(x_p, y_p) + \Delta x_{refine}(x_p, y_p), y_p + \Delta y_{prd}(x_p, y_p) + \Delta y_{refine}(x_p, y_p)))\quad \text{EQUATION 11}$$

During linearization, the value of $R_{ref}(x, y)$ of equation 11 is approximated using some known approximation method so that it becomes linearly dependent on ($\Delta x_{refine}(x_p, y_p)$, $\Delta y_{refine}(x_p, y_p)$). Then, the square prediction error $D_i$ can be approximated as follows:

$$D_i = \sum_{p=1}^{P} (e_{p,1}c_1 + e_{p,2}c_2 + \ldots + e_{p,6}c_6 - w_p)^2 \quad \text{EQUATION 12}$$

The values of e and w are dependent upon the type of approximation method utilized.

Thereafter, matrices are constructed by the motion analyzer. As the elements under the square in equation (12) are linear combinations of coefficients $c_n$, minimization of the equation is fully equivalent to minimization of the following matrix expression:

$$(E_i c_i - w_i)^T (E_i c_i - w_i) \quad \text{EQUATION 13}$$

Where $E_i$, $w_i$, and $c_i$ are as follows:

$$E_i = \begin{bmatrix} e_{1,1} & e_{1,2} & \ldots & e_{1,N+M} \\ e_{2,1} & e_{2,2} & \ldots & e_{2,N+M} \\ \ldots & \ldots & \ldots & \ldots \\ e_P & e_{P,2} & \ldots & e_{P,N+M} \end{bmatrix}, w_i = \begin{bmatrix} w_{,1} \\ w_2 \\ \ldots \\ w_p \end{bmatrix}, c_i = \begin{bmatrix} c_{1,} \\ c_2 \\ \ldots \\ c_{N+M} \end{bmatrix} \quad \text{EQUATION 14}$$

Based on $E_i$ and $w_i$, a matrix $A_i$ and a vector $d_i$ are calculated as follows:

$$A_i = E_i^T E_i. \quad \text{EQUATION 15}$$

$$d_i = E_i^T w_i. \quad \text{EQUATION 16}$$

The motion analyzer generates an output which includes an (N+M)×(N+M) upper triangular matrix $R_i$ which has the following form:

$$R_i = \begin{bmatrix} x & x & x & \ldots & x \\ 0 & x & x & \ldots & x \\ 0 & 0 & x & \ldots & x \\ \vdots & \vdots & \vdots & \ddots & \vdots \\ 0 & 0 & 0 & \ldots & x \end{bmatrix}$$

where the symbol x denotes a nonzero element which is obtained by calculating a Cholesky factorization of matrix $A_i$ as follows:

$$A_i = R_i^T R_i. \quad \text{EQUATION 17}$$

The motion analyzer also generates a vector $z_i$ which is obtained by solving the following set of equations:

$$R_i^T z_i = d_i. \quad \text{EQUATION 18}$$

The matrix $R_i$ and the vector $z_i$ are the output parameters of the motion analyzer and together such output parameters constitute a representation of a refinement motion vector field suitable for manipulation at the motion coefficient remover 66.

The output of the motion analyzer 64 forms the input to the motion coefficient remover 66. The operations performed by the remover 66 when setting some of the refinement motion field coefficients to zero include, for instance, removing those elements that correspond to coefficients that can be removed from $R_i$ with $\tilde{z}^I$. The result is a modified matrix R and vector z.

Various manners can be utilized to specify, or imply by default, the segment or the set of neighboring segments from which the prediction motion field is derived. Also, different manners can be utilized to generate the prediction motion field $\Delta x_{prd}(x, y)$, $\Delta y_{prd}(x, y)$, to linearize equation (11) above, and to solve the set of equations (18).

Figure 4:
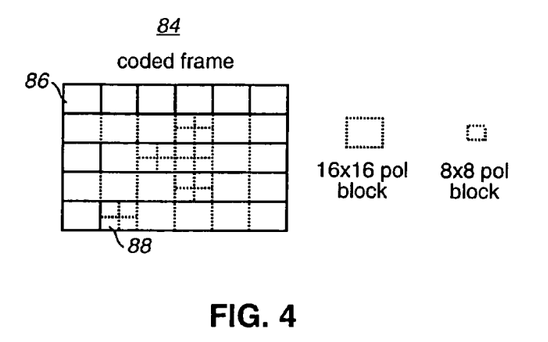
FIG. 4 illustrates a manner by which a video frame is divided into segments during operation of an embodiment of the present invention.

FIG. 4 illustrates a single video frame 84, here shown to be divided into a plurality, here thirty, segments 86. Each of the segments 86 is here formed of a sixteen pixel by sixteen pixel block. And, each of the segments can further be divided to form smaller segments. Here some of the segments 86 are divided to form eight pixel by eight pixel blocks 88. The segments 86 are commonly referred to as macroblocks. The coding of a frame is performed by scanning from left-to-right and top-to-bottom, macroblock by macroblock.

As described previously, the motion vector field of a given segment obeys the additive motion model given in equation (8). The way in which the prediction, the refinement, and the final motion prediction fields are obtained is, described below. In the exemplary implementation, either of the motion prediction or motion refinement fields can be zero. Therefore, with respect to motion vector fields, a given segment $S_i$ can be coded in any of various manners. For instance, the segment can be coded using only prediction motion vector fields extrapolated from a neighboring segment. Or, the segment can be coded by using a prediction motion vector field extrapolated from a neighboring segment together with a compressed refinement motion vector field. Alternately, the segment can be coded using only a compressed motion vector field without utilization of a prediction field. If the prediction field is set to zero, however, refinement information is sent. The segment can also be coded by using a zero motion vector field, e.g., a copy from the reference frame $R_{ref}(x,y)$. And, for example, the segment can be coded using intra coding in which no motion vector field is utilized.

In the exemplary implementation, independent of the presence of a prediction motion vector field or a refinement motion vector field, the final motion vector field of a given motion compensated segment $S_i$ has an affine model given by the following equation, here in which the superscript i indicates the fact that the coefficients are associated with a corresponding segment $S_i$:

$$\Delta x(x,y) = \beta_1^i + \beta_2^i \cdot (y - y_o^i) + \beta_3^i \cdot (x - x_o^i)$$

$$\Delta x(x,y) = \beta_4^i + \beta_5^i \cdot (y - y_o^i) + \beta_6^i \cdot (x - x_o^i) \qquad \text{EQUATION 19}$$

wherein $x_o^i$ and $y_o^i$ are coordinates of the upper left-most pixel in the segment and $\beta_1^i, \ldots \beta_6^i$ are the affine coefficients calculated as described below.

In the exemplary implementation of the decoder 14, operations are performed by utilizing integer precision. This is achieved by utilizing a fixed point implementation corresponding to a fixed precision. As a result, all of the coefficients referred to hereinbelow are integer-valued, including the coefficients of equation (19). In other implementations, other precisions are utilized.

In the exemplary implementation, one bit is sent to the decoder 14 to signal whether the prediction field of a neighbor is used or not, but only in the case when there is at least one prediction neighbor candidate. A neighboring segment $S_k$ is a candidate for prediction of motion vector field of a segment $S_i$ only if it has a nonzero motion vector field.

Also in the exemplary implementation, prediction is performed only from a nearest neighboring block at the left or just above the current segment. Therefore, the number of neighboring segments can be at most four, i.e., two eight by eight pixel blocks above and two eight by eight pixel blocks at the left. In this implementation, whenever the bit sent to the decoder indicates that prediction from a neighboring segment is used, the number and location of prediction candidates is calculated, in both the encoder and decoder. If there are, e.g., two, three, or four prediction candidates, then one or two selection bits are sent to the decoder 14 to indicate the candidate to be used. The selection information is made, e.g., of one prediction direction bit which may, or may not, exist, followed by one discrimination bit, which also may, or may not, exist.

Figure 5:
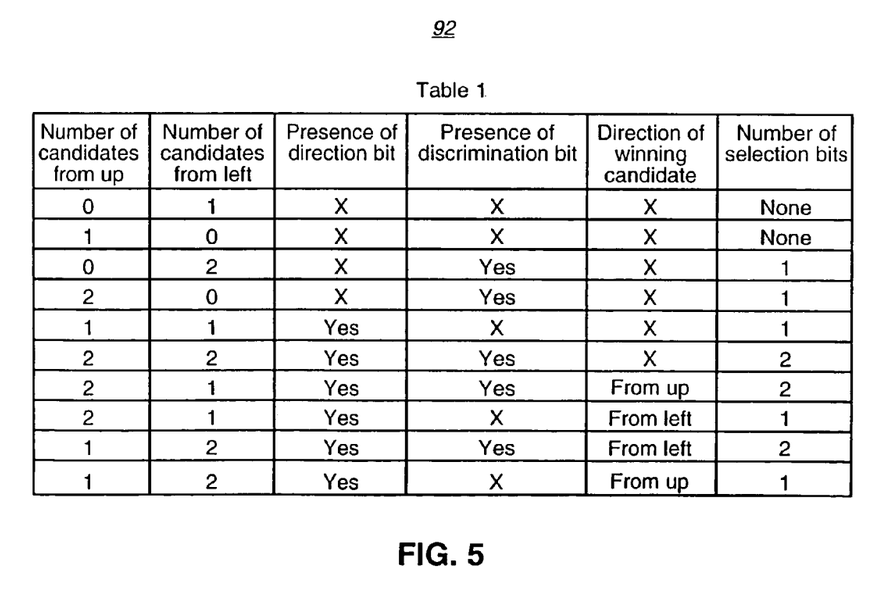
FIG. 5 illustrates a table indicating exemplary values and meaning of selection bits utilized during operation of an embodiment of the present invention.

FIG. 5 illustrates a table, shown generally at 92, which lists the meanings and values of selection bits in an exemplary implementation of the present invention. The mark x denotes absence or logical don't cares depending on context. The direction bit indicates whether candidate neighbor segments are available above or to the left of the segment currently being predicted. The discrimination bit specifies which of two remaining candidates must be used for prediction of motion vector fields. That is to say, when the segments above or to the left are chosen, two selection possibilities are available. The discrimination bit identifies the selection. In the final four cases shown in the table, the discrimination bit may, or may not, exist depending on the location of the most suitable candidate segment. For instance, if the direction bit indicates "from left" where there is only a single candidate, then the discrimination bit is not needed. In the decoder 14, the direction the winning candidate is known after decoding the direction bit.

Once the neighboring segment has been selected for the prediction of the current segment, the prediction motion vector field is simply the extrapolation of the motion vector field of the segment inside the pixel domain covered by the current segment as follows:

$$\Delta x_{prd}(x,y) = \beta_1^k + \beta_2^k \cdot (y - y_o^k) + \beta_3^k \cdot (x - x_o^k)$$

$$\Delta y_{prd}(x,y) = \beta_4^k + \beta_5^k \cdot (y - y_o^k) + \beta_6^k \cdot (x - x_o^k) \qquad \text{EQUATION 20}$$

where $x_o^k$, $y_o^k$ are coordinates of the upper left-most pixel in the neighboring segment $S_k$ and $\beta_1^k, \ldots \beta_6^k$ are integer-valued coefficients corresponding to the motion field of segment $S_k$. In equation 20, the superscript k indicates that the coefficients are associated with the neighboring segment $S_k$.

Analysis of equations 19 and 20 indicates that the motion vector field of the neighboring segment $S_k$ has become the prediction motion vector field of the segment $S_i$ by simply extrapolating it to the pixels inside the current segment $S_i$.

The refinement motion vector field assumes the affine orthogonal model given in equation 9. However, in the preferred implementation, the refinement coefficients are converted into a set of auxiliary refinement coefficients. The auxiliary refinement coefficients enable a fast computation of the final predicted motion field.

In the preferred implementation, refinement coefficients in equation 9 which correspond to an orthogonal affine set of basis functions are first converted to a different set of auxiliary coefficients. These coefficients correspond to the set of basis functions $\{1, (y - y_o), (x - x_o)\}$ where $x_o$, $y_o$ are coordinates of the upper-left most pixel in the segment. This conversion is performed in order to achieve a common basis function representation for both prediction and refined motion vector fields, i.e., in order to use the same set of basis functions. By doing so, the final motion vector field is computed based on the summation of two sets of coefficients, as will be described later. Based upon the refinement coefficients, $c_1, \ldots, c_6$ the following auxiliary coefficients $\alpha_1, \ldots \alpha_6$ are calculated for segments $S_i$. For segments which are sixteen by sixteen pixel blocks; this is done as follows:

$$\begin{bmatrix} a_1 \\ a_2 \\ a_3 \end{bmatrix} = \begin{bmatrix} 4096 & 6664 & 6664 \\ 0 & -889 & 0 \\ 0 & 0 & -889 \end{bmatrix} \cdot \begin{bmatrix} c_1 \\ c_2 \\ c_3 \end{bmatrix} \quad \text{EQUATION 21}$$

$$\text{and} \begin{bmatrix} a_4 \\ a_5 \\ a_6 \end{bmatrix} = \begin{bmatrix} 4096 & 6664 & 6664 \\ 0 & -889 & 0 \\ 0 & 0 & -889 \end{bmatrix} \cdot \begin{bmatrix} c_4 \\ c_5 \\ c_6 \end{bmatrix}.$$

For segments $S_i$ which are eight by eight pixel blocks, the calculation takes the form:

$$\begin{bmatrix} a_1 \\ a_2 \\ a_3 \end{bmatrix} = \begin{bmatrix} 8192 & 12513 & 12513 \\ 0 & -3575 & 0 \\ 0 & 0 & -3575 \end{bmatrix} \cdot \begin{bmatrix} c_1 \\ c_2 \\ c_3 \end{bmatrix} \quad \text{EQUATION 22}$$

$$\text{and} \begin{bmatrix} a_4 \\ a_5 \\ a_6 \end{bmatrix} = \begin{bmatrix} 8192 & 12513 & 12513 \\ 0 & -3575 & 0 \\ 0 & 0 & -3575 \end{bmatrix}.$$

As a result, the following integer-valued displacements represent the refinement motion vector field of segment $S_i$:

$$\Delta x_{refine}(x,y) = \alpha_1 + \alpha_2 \cdot (y - y_o^i) + \alpha_3 \cdot (x - x_o^i).$$

$$\Delta x_{refine}(x,y) = \alpha_4 + \alpha_5 \cdot (y - y_o^i) + \alpha_6 \cdot (x - x_o^i) \quad \text{EQUATION 23}$$

where $x_o^i$, and $y_o^i$ are coordinates of the upper left-most pixel within the segment $S_i$. The superscript i indicates that these coordinates are associated with the current segment $S_i$.

In the exemplary implementation, the final set of affine coefficients for a given segment which uses the neighboring segment $S_k$ for motion field prediction is calculated as in the following equation in which the superscripts i and k indicate that the corresponding coefficients are associated with $S_i$ and $S_k$, respectively:

$$\beta_1^i = \alpha_1 + \Delta x_{prd}(x_o^i, y_o^i)$$

$$\beta_2^i = \alpha_2 + \beta_2^k$$

$$\beta_3^i = \alpha_3 + \beta_3^k$$

and $$\beta_4^i = \alpha_4 + \Delta y_{prd}(x_o^i, y_o^i)$$

$$\beta_5^i = \alpha_5 \beta_5^k$$

$$\beta_6^i = \alpha_6 + \beta_6^k \quad \text{EQUATION 24}$$

Based upon the integer-valued coefficients of $\beta_1 \ldots \beta_6$, the set of final motion vectors for the segment $S_i$ is generated using equation 19. The way by which the motion vectors are used to calculate the pixel intensities from the reference frame is described below.

In the exemplary implementation, the presence of motion coefficients in the bitstream is signaled by one bit whenever refinement or nonrefinement motion coefficients can be expected. This bit is referred to as a motion coefficient indicator (MCI).

Also in the exemplary implementation, when motion coefficients are transmitted for a segment $S_i$, a variable-length code, referred to as a motion coefficient pattern (MCP) is first sent to indicate which coefficients have nonzero values. An all-zero pattern is the only non-valid pattern, as this possibility can be signaled by the MCI bit alone. The total number of valid patterns which can be indicated by the MCP codeword is sixty-three. This is a property of the affine model. As it has six coefficients, there are $2^6$, i.e., 64, possible results. Thus, the MCP codeword has 63 possible values as zero is not valid. Following the MCP codeword are the encoded values of each nonzero motion coefficient indicated by the MCP pattern. The encoded values of each non-zero coefficient follow the MCP codeword. A motion coefficient $c_j$ is encoded as an amplitude variable-length codeword indicating the absolute value of $c_j$ followed by a sign bit indicating the sign of $c_j$. In the exemplary implementation, the same variable-length coding table is used to encode the amplitude of different coefficients. Different coding tables can be used. Zero-amplitude is not amongst the valid options as this possibility can be indicated by the MCP codeword.

The final motion vector field components calculated by using equation 19 correspond to a discretization step of:

$$D = \frac{1}{65536} = 0.0000152587890625 \quad \text{EQUATION 25}$$

If ($\Delta x$ (x,y), $\Delta y$(x, y)) denote final motion compensation displacements for segment $S_i$, then the corresponding non-integer coordinates in the previous frame are:

$$x' = x + \Delta x(x,y) \cdot D$$

$$y' = y + \Delta y(x,y) \cdot D \quad \text{EQUATION 26}$$

In the preferred implementation, the reference frame $R_{ref}$ is of a size of M×N pixels with intensity values in the range $\{0, 1, \ldots, 255\}$. The valid pixel coordinates (x',y') are defined only in the range of $\{0, 1, \ldots, M-1\} \times \{0, 1, \ldots, N-1\}$. When motion compensated prediction requires evaluating the luminance and chrominance values at non-integer locations in the reference frame $R_{ref}$ a discrete version of cubic convolution interpolation is used. In the exemplary implementation, fixed point precision is employed when calculating reconstruction values in the reference frame as described below.

First, the integer-valued displacements ($\Delta x(x,y)$, $\Delta y(x,y)$) corresponding to the pixel (x,y) in segment $S_i$ are expressed in modulo-65536 form as follows:

$$\Delta x(x,y) = dx \cdot 65536 + \delta x, \; \delta x \in \{0,1,\ldots,65535\}$$

$$\Delta x(x,y) = dy \cdot 65536 + \delta y, \; \delta y \in \{0,1,\ldots,65535\} \quad \text{EQUATION 27}$$

where dx, dy, $\delta x$, and $\delta y$ are integer values with the latter two being always non-negative.

The $x'_j, y'_k$ integer-valued coordinates of the four by four cubic convolution window are defined as:

$$x'_j = \text{sat}(x + dx + j - 2, M-1), \; j=1,2,3,4$$

$$x'_k = \text{sat}(y + dy + k - 2, N-1), \; k=1,2,3,4 \quad \text{EQUATION 28}$$

Wherein sat(u, v) is the saturation function as follows:

$$sat(u, v) = \begin{cases} 0 & u < 0 \\ u & 0 \le u \le v \\ v & u > v \end{cases} \qquad \text{EQUATION 29}$$

Consequently, the sixteen integer pixel values $r_{jk}$ used in the cubic convolution are as follows:

$$r_{jk} = R_{ref}(x'_j, y'_k) j, k=1,2,3,4 \qquad \text{EQUATION 29}$$

where $x'_j, y'_k$ are the integer-valued coordinates computed in equation 28.

Then, the convolution coefficients are computed. In the following, the integer division by truncation is denoted by "/" and both or its operands are always non-negative integers. By using integer truncation, following $u_j, v_k$ j,k=1, 2, 3, 4 are computed:

$u_1 = \text{spl}(\delta x/256 + 256)$ $u_2 = \text{spl}(\delta x/256)$ $u_3 = \text{spl}(256 - (\delta x/256))$ $u_4 = 16384 - (u_1 + u_2 + u_3)$ and $v_1 = \text{spl}(\delta y/256 + 256)$ $v_2 = \text{spl}(\delta y/256)$ $v_3 = \text{spl}(256 - (\delta y/256))$ $v_4 = 16384 - (v_1 + v_2 + v_3)$ \qquad EQUATION 31 where $\delta x, \delta y$ are the integer values of equation 27 and spl(s) is the integer-valued function of positive integer argument:

$$spl(s) = \begin{cases} 16384 - (s^2 \cdot (1280 - 3 \cdot s) + 1024)/2048 & s \in \{0, 1, \ldots, 255\} \\ -((t \cdot (65536 + t^2 - 512 \cdot t) + 1024)/2048 & s \in \{256, \ldots, 511\}, t = s - 256 \\ 0 & \text{otherwise} \end{cases} \qquad \text{EQUATION 32}$$

Then the reference pixel value is computed. By using integer division by truncation, the reference pixel value is computed as follows:

$$r = sat\left(\left(\begin{bmatrix} r_{11} & r_{21} & r_{31} & r_{41} \\ r_{12} & r_{22} & r_{32} & r_{42} \\ r_{13} & r_{23} & r_{33} & r_{43} \\ r_{14} & r_{24} & r_{34} & r_{44} \end{bmatrix} \cdot \begin{bmatrix} u_1 \\ u_2 \\ u_3 \\ u_4 \end{bmatrix}\right)^T / 256 \cdot \begin{bmatrix} v_1 \\ v_2 \\ v_3 \\ v_4 \end{bmatrix} + 2^{19}\right)/2^{20}, 255\right) \qquad \text{EQUATION 33}$$

where integer-valued coefficients $r_{jk}$ are given by equation 30 and integer-valued coefficients $u_j, v_k$ j,k=1, 2, 3, 4 are given by equation 31 and function sat(.,.) is given by equation 29.

At the motion analyzer, the step of linearization is performed by employing a first order Taylor expansion of $R_{ref}(x,y)$ around:

$x'_p = x_p + \Delta x(x_p, y_p)$ $y'_p = y_p + \Delta y(x_p, y_p)$ \qquad EQUATION 34 with respect to x and y:

$$R_{ref}(x_p + \Delta x_{prd}(x_p, y_p) + \Delta x_{refine}(x_p, y_p), y_p + \Delta y_{prd}(x_p, y_p) + \Delta_{refine}(x_p y_p)) \approx R_{ref}(x'_p, y'_p) + \qquad \text{Equation 35}$$

$$(\Delta x_{refine}(x_p, y_p) + \Delta x_{prd}(x_p, y_p) - \Delta x(x_p, y_p)) \cdot G_x(x'_p, y'_p) +$$

$$(\Delta y_{refine}(x_p, y_p) + \Delta y_{prd}(x_p, y_p) - \Delta y(x_p, y_p)) \cdot G_y(x'_p, y'_p)$$

$G_x(x'_p, y'_p)$ and $G_y(x'_p, y'_p)$ are values of the derivative of the reference frame $R_{ref}$ with respect to x and y. Using such an approximation, the elements of matrix $E_i$ and vector $w_i$ in equation 14 are:

$$e_{pk} = \begin{cases} f_k(x_p, y_p) G_x(x'_p, y'_p), & k = 1, 2, \ldots, N \\ f_k(x_p, y_p) G_x(x'_p, y_p), & k = N+1, N+2, \ldots, N+M \end{cases} \qquad \text{Equation 36}$$

$$w_p = I_n(x_p, y_p) - R_{ref}(x'_p, y'_p) + \qquad \text{Equation 37}$$

$$G_x(x'_p, y'_p)\Delta x(x_p, y_p) + G_y(x'_p, y'_p)\Delta y(x_p, y_p) -$$

$$G_x(x'_p, y'_p)\Delta x_{prd}(x_p, y_p) - G_y(x'_p, y'_p)\Delta y_{prd}(x_p, y_p)$$

The previous descriptions are of preferred examples for implementing the invention and, the scope of the invention should not necessarily be limited by this description. The scope of the present invention is defined by the following claims:

We claim:

1. A method of decoding encoded information representative of a video sequence, said video sequence comprising a plurality of video frames, said decoding method comprising the steps of:
   receiving encoded information representative of a segment of a current frame of said video sequence;
   identifying a coding mode of the encoded information, the coding mode being one of at least a first coding mode and a second coding mode; and
   reconstructing the segment of the current frame of the video sequence;
   wherein the reconstructing step is performed using a first motion field model derived using motion compensated prediction with respect to a previously-encoded frame of the video sequence if the identified coding mode is the first coding mode; and
   wherein the reconstructing step is performed using a second motion field model based on a motion field model determined for an adjacent previously-encoded segment of the current frame if the identified coding mode is the second coding mode.

2. The method according to claim 1, further comprising the step of forming a prediction motion field model for the segment based on the motion field model determined for the adjacent previously-encoded segment of the current frame.

3. The method according to claim 2, wherein the prediction motion field model is formed by projecting the motion field model determined for the adjacent previously-encoded segment from the adjacent previously-encoded segment into the segment being reconstructed.

4. The method according to claim 2, wherein the second motion field model is formed as a combination of the prediction motion field model and a refinement motion field model.

5. The method according to claim 4, wherein the refinement motion field model represents a difference between the first motion field model and the prediction motion field model.

6. The method according to claim 4, wherein in the second coding mode the encoded information representative of the segment of the current frame comprises motion coefficient information representative of the refinement motion field model.

7. The method according to claim 6, wherein the motion coefficient information comprises an indication of a non-zero coefficient pattern and at least one non-zero coefficient value.

8. The method according to claim 2, wherein in the second coding mode the encoded information representative of the segment of the current frame comprises an indication of the adjacent previously-encoded segment whose motion field model is to be used to form the prediction motion field model for the segment.

9. The method according to claim 8, wherein the indication of the adjacent previously-encoded segment comprises information about the position of the adjacent previously-encoded segment with respect to the segment being reconstructed.

10. The method according to claim 8, wherein the indication of the adjacent previously-encoded segment comprises information about a sub-segment within the adjacent previously encoded segment.

11. The method according to claim 1, wherein in the first coding mode the encoded information representative of the segment of the current frame comprises motion coefficient information.

12. The method according to claim 11, wherein the motion coefficient information comprises an indication of a non-zero coefficient pattern and at least one non-zero coefficient value.

13. A video decoder for decoding encoded information representative of a video sequence, said video sequence comprising a plurality of video frames, said decoder including:
   an input for receiving encoded information representative of a segment of a current frame of the video sequence;
   means for identifying a coding mode of the encoded information, the coding mode being one of at least a first coding mode and a second coding mode;
   means for reconstructing the segment of the current frame of the video sequence using a first motion field model derived using motion compensated prediction with respect to a previously-encoded frame of the video sequence if the identified coding mode is the first coding mode; and
   means for reconstructing the segment of the current frame of the video sequence using a second motion field model based on a motion field model determined for an adjacent previously-encoded segment of the current frame if the identified coding mode is the second coding mode.

14. The video decoder according to claim 13, arranged to form a prediction motion field model for the segment from the motion field model determined for the adjacent previously-encoded segment of the current frame.

15. The video decoder according to claim 14, arranged to form the prediction motion field model by projecting the motion field model determined, for the adjacent previously-encoded segment from the adjacent previously-encoded segment into the segment being reconstructed.

16. The A video decoder according to claim 14, arranged to form the second motion field model as a combination of the prediction motion field model and a refinement motion field model.

17. The video decoder according to claim 16, wherein the refinement motion field model represents a difference between the first motion field model and said prediction motion field model.

18. The video decoder according to claim 16, wherein in the second coding mode said decoder is arranged to decode the encoded information representative of the segment of the current frame to recover motion coefficient information representative of the refinement motion field model.

19. The video decoder according to claim 13, wherein in said first coding mode said decoder is arranged to decode the encoded information representative of the segment of the current frame to recover motion coefficient information.

20. The video decoder according to claim 13, wherein in the second coding mode said decoder is arranged to decode the encoded information representative of the segment of the current frame to recover an indication of the adjacent previously-encoded segment.

21. The video decoder according to claim 20, wherein the indication of the adjacent previously-encoded segment, comprises information about the position of the adjacent previously-encoded segment with respect to the segment being reconstructed.

22. The video decoder according to claim 20, wherein the indication of the adjacent previously-encoded segment comprises information about a sub-segment within the adjacent previously-encoded segment.

23. The video decoder according to claim 20, wherein in the second coding mode the means for reconstructing the segment of the current frame is arranged to derive the prediction motion field model from the motion field model for the indicated adjacent previously-encoded segment.

24. The video decoder according to claim 23, wherein in the second coding mode the means for reconstructing the segment of the current frame is further arranged to reconstruct the segment of the current frame by combining the prediction motion field model with the refinement motion field model.

* * * * *